US010759051B2

(12) United States Patent
Tan et al.

(10) Patent No.: US 10,759,051 B2
(45) Date of Patent: Sep. 1, 2020

(54) ARCHITECTURE AND METHODS FOR ROBOTIC MOBILE MANIPULATION SYSTEM

(71) Applicant: General Electric Company, Schenectady, NY (US)

(72) Inventors: Huan Tan, Clifton Park, NY (US); Weston Blaine Griffin, Niskayuna, NY (US); Lynn Ann DeRose, Gloversville, NY (US); Yi Xu, Menlo Park, CA (US); Ying Mao, Burlingame, CA (US); Balajee Kannan, Clifton Park, NY (US)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 0 days.

(21) Appl. No.: 15/960,272

(22) Filed: Apr. 23, 2018

(65) Prior Publication Data

US 2019/0321977 A1    Oct. 24, 2019

(51) Int. Cl.
*B25J 9/16* (2006.01)
*G05D 1/02* (2020.01)
*B25J 15/00* (2006.01)

(52) U.S. Cl.
CPC ............ *B25J 9/1664* (2013.01); *B25J 9/162* (2013.01); *B25J 9/1697* (2013.01); *B25J 15/0004* (2013.01); *G05D 1/0212* (2013.01); *G05D 1/0246* (2013.01); *Y10S 901/09* (2013.01); *Y10S 901/39* (2013.01); *Y10S 901/47* (2013.01)

(58) Field of Classification Search
CPC ...................................................... B25J 9/162
See application file for complete search history.

(56) References Cited

U.S. PATENT DOCUMENTS

| 5,758,298 | A | 5/1998 | Guldner |
| 8,229,595 | B2 | 7/2012 | Seelinger et al. |
| 9,227,323 | B1* | 1/2016 | Konolige ............. G06K 9/3208 |
| 9,346,164 | B1* | 5/2016 | Edsinger ................ B25J 9/1694 |
| 9,415,513 | B2 | 8/2016 | Tian et al. |
| 9,427,874 | B1* | 8/2016 | Rublee ................... B25J 9/1697 |
| 9,466,046 | B1* | 10/2016 | Theobald ............. G06Q 10/087 |
| 9,486,921 | B1* | 11/2016 | Straszheim ............ B25J 9/1697 |
| 9,532,508 | B1* | 1/2017 | Stubbs ............... G05B 19/0425 |

(Continued)

FOREIGN PATENT DOCUMENTS

| CN | 106338289 A | 1/2017 |
| JP | H05080842 A | 4/1993 |
| JP | 2007290056 A | 11/2007 |

OTHER PUBLICATIONS

PCT/US2019/021990; International Search Report Written Opinion dated Jun. 25, 2019, pp. 1-9.

(Continued)

*Primary Examiner* — Thomas Randazzo
(74) *Attorney, Agent, or Firm* — Fletcher Yoder, P.C.

(57) ABSTRACT

The present approach relates to integrated planning of robot navigation and manipulator motion in performing tasks. In particular, as discussed herein sensor information, such as visual information, may be used for the robot to locate a target object when it arrives at a working location. Adjustments may be made based on this information that may include moving the robot and planning a manipulator arm motion.

17 Claims, 4 Drawing Sheets

(56) References Cited

U.S. PATENT DOCUMENTS

| | | | |
|---|---|---|---|
| 9,630,316 B2* | 4/2017 | Konolige | B25J 5/007 |
| 9,688,472 B1 | 6/2017 | Stubbs et al. | |
| 9,740,212 B2* | 8/2017 | D'Andrea | G05B 19/41895 |
| 9,785,911 B2 | 10/2017 | Galluzzo et al. | |
| 2001/0035907 A1* | 11/2001 | Broemmelsiek | G01S 3/7864 |
| | | | 348/169 |
| 2010/0039311 A1* | 2/2010 | Woodington | G01S 13/44 |
| | | | 342/70 |
| 2010/0165101 A1* | 7/2010 | Kludas | G06K 9/033 |
| | | | 348/135 |
| 2010/0171826 A1* | 7/2010 | Hamilton | G06Q 30/06 |
| | | | 348/135 |
| 2010/0234993 A1* | 9/2010 | Seelinger | B25J 9/1697 |
| | | | 700/254 |
| 2010/0298977 A1* | 11/2010 | Fahn | G05D 1/0246 |
| | | | 700/259 |
| 2012/0165979 A1* | 6/2012 | Lim | B25J 9/162 |
| | | | 700/253 |
| 2014/0316570 A1* | 10/2014 | Sun | B25J 9/1674 |
| | | | 700/255 |
| 2015/0365660 A1* | 12/2015 | Wu | G05D 1/0234 |
| | | | 348/158 |
| 2016/0059416 A1* | 3/2016 | Tian | B25J 9/1666 |
| | | | 700/253 |
| 2017/0088360 A1* | 3/2017 | Brazeau | G05B 19/41895 |
| 2017/0173796 A1* | 6/2017 | Kim | G05D 1/0225 |
| 2017/0341235 A1* | 11/2017 | Baloch | B25J 9/162 |
| 2017/0341236 A1* | 11/2017 | Patrick | G05D 1/0251 |
| 2017/0357270 A1* | 12/2017 | Russell | G05D 1/0257 |
| 2018/0155129 A1* | 6/2018 | Lagziel | B25J 5/02 |
| 2018/0161986 A1* | 6/2018 | Kee | G06K 9/00664 |
| 2018/0247160 A1* | 8/2018 | Rohani | G06N 3/008 |
| 2018/0259971 A1* | 9/2018 | Nishimura | G05D 1/0246 |
| 2018/0364731 A1* | 12/2018 | Liu | G06T 1/20 |
| 2018/0370038 A1* | 12/2018 | Isaac | B25J 19/023 |
| 2019/0091860 A1* | 3/2019 | Lipay | B65G 1/137 |
| 2019/0099884 A1* | 4/2019 | Kummerle | B25J 9/1697 |

OTHER PUBLICATIONS

Datta, S., et al.; "Development of autonomous mobile robot with manipulator for manufacturing environment", The International Journal of Advanced Manufacturing Technology, vol. 38, Issue:5-6, pp. 536-542, Aug. 2008.

Bagnell, J. Andrew, et al.; "An Integrated System for Autonomous Robotics Manipulation", Robotics Institute at Carnegie Mellon University, 2012.

* cited by examiner

ARCHITECTURE AND METHODS FOR ROBOTIC MOBILE MANIPULATION SYSTEM

STATEMENT REGARDING FEDERALLY SPONSORED RESEARCH & DEVELOPMENT

This invention was made with Government support under contract number VA118-12-C-0051. The Government has certain rights in the invention.

BACKGROUND

The subject matter disclosed herein relates to task planning and manipulation of objects by a robot Various entities may employ robots or other autonomously controlled devices in various environments for the performance of tasks in the respective environment. For example, such devices may be employed to move or deliver items within the environment, to sort items for future use, to clean or inspect portions of the environment, to operate instrumentation or equipment within the environment, or to assist humans in the environment with various tasks. Many of these tasks require some form of robotic manipulation of items in the vicinity of the robot as part of the task.

However, various challenges exist with respect to the use of mobile robots capable of manipulating objects in their environment. For example, uncertainty with respect to the environment and/or instrumentation may pose a challenge. This may be particularly true in environments where humans are also present and may move objects relevant to a task or may otherwise present a disruption to the navigation of the robot with respect to the task. In particular, in contrast to certain manufacturing settings where the robot base may be stationary and the manipulator and manipulated objects are in consistent and knowable locations, in settings where people are present and where the robot itself moves between locations, it may be difficult to pre-plan the movements necessary of the robot and manipulator to perform a task.

BRIEF DESCRIPTION

In one embodiment, a processor-implemented method is provided for manipulating one or more objects. In accordance with this method, at a task location images are acquired while moving a manipulator of a robot relative to the task location. Feature points, by which the manipulator may interact with an object, are detected within the images. Based upon the position and orientation of detected feature points, it is determined whether to move the robot prior to manipulating the object. Upon determining to move the robot prior to manipulating the object, robot base motion trajectories and manipulator motion trajectories are generated. The robot is moved in accordance with the robot base motion trajectories to reposition the robot. The manipulator is moved in accordance with the manipulator motion trajectories to manipulate the object.

In a further embodiment, a robotic manipulation system is provided. In accordance with this embodiment, the robotic manipulation system includes: a mobile robot comprising: one or more sensors configured to generate sensor data of at least a portion of the environment in which the robot is located; and a driving system configured to move a base of the robot. The robotic manipulation system further includes: a manipulator attached to or formed integrally with the robot, the manipulator comprising: an effector positioned on the manipulator and configured to interact with objects; a camera configured to generate images of an area accessible by the manipulator; and a driving system configured to move the manipulator. The robotic manipulation system further includes: one or more processing components configured to: cause acquisition of images by the camera while moving the manipulator relative to the task location; detect feature points within the images with which the manipulator may interact with a respective object; based upon the position and orientation of detected feature points, determine whether to move the robot prior to manipulating the respective object; upon determining to move the robot prior to manipulating the respective object, generating robot base motion trajectories and manipulator motion trajectories; moving the robot in accordance with the robot base motion trajectories to reposition the robot; and moving the manipulator in accordance with the manipulator motion trajectories to manipulate the respective object.

In an additional embodiment, one or more non-transitory computer-readable media encoding processor-executable routines are provided. In accordance with this embodiment, the routines, when executed by a processor, cause acts to be performed comprising: at a task location, acquiring images while moving a manipulator of a robot relative to the task location; detecting feature points within the images with which the manipulator may interact with an object; based upon the position and orientation of detected feature points, determining whether to move the robot prior to manipulating the object; upon determining to move the robot prior to manipulating the object, generating robot base motion trajectories and manipulator motion trajectories; moving the robot in accordance with the robot base motion trajectories to reposition the robot; and moving the manipulator in accordance with the manipulator motion trajectories to manipulate the object.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, robots or other autonomously controlled devices may be employed in various environments for the performance of tasks. For example, such devices may be employed to move or deliver items within the environment, to clean or inspect portions of the environment, to operate instrumentation or equipment within the environment, to sort items or instruments for a pending task, or to otherwise assist humans in the environment with various tasks. Many of these tasks require some form of robotic manipulation of items in the vicinity of the robot as part of the task.

In particular, it may be desirable to utilize robots capable of moving from one location to another and of manipulating one or more objects (such as via a manipulator arm having an end-effector mechanism) at the locations. Indeed, autonomous mobile robots with manipulation capabilities could enable increased flexibility in workspaces and eliminate the need for multiple stationary robots to complete the same tasks.

Certain challenges, however, exist with respect to manipulation or handling by mobile robots, particularly in contexts where the robot is performing tasks in an environment shared with humans. For example, robot mobility involves localization and navigation capability while avoiding collision of obstacles in the working environment. In addition, manipulation of objects by a robot manipulator typically relies on searching for and identifying manipulation points, planning motion trajectories in high-dimensional task space, and grasping objects using end-effectors, and thus is subject complexity at varying points in the process.

By way of example, in a dynamic environment where humans are present objects or items to be manipulated by a robot as part of performing an assigned task may be moved or not in a precisely predictable location. This uncertainty may make it difficult to plan the movements of the robot's base and/or manipulator with respect to a task. Similarly, even when movements are planned, the presence of humans moving within the environment may make it difficult to simply execute a series of planned movements as contact avoidance protocols may result in interruptions to the planned movements. Thus, the mobility and manipulation requirements for task performance by a robot may be difficult to meet.

To overcome the uncertainties that affect manipulation performance, integrated planning involving both the navigation and the manipulation, as discussed herein, is beneficial. In particular, as discussed herein visual information is used for the robot to locate a target object when it arrives at a working location. A self-aligned gripper may also be employed to further increase tolerance for error.

As used herein, the terms robots or robotic devices include, but are not limited to, ground-based mobile robots, including those with legs, wheels, tracks, etc. Such devices may also include actuators or other movable components (e.g., grippers, manipulator arms, and so forth) that are also programmable and movable to perform tasks. It should be understood that devices characterized as robots herein encompass any suitable autonomously moving devices that are capable of programmable movement with no or limited human oversight or of remote control by an automated system or controller. Such programmable movement, when employed, can be based on either locally generated path waypoints or guidance or path guidance and waypoints generated by a remote system (e.g., a server or controller) and communicated to the robot. Thus, as used herein, such devices move during an operational phase or period entirely or primarily without direct human intervention or control or with limited or partial human intervention or oversight. Though ground-based robots are primarily discussed herein, the present approaches may also be relevant to navigation and and/or task planning in the context of unmanned aerial vehicles (UAVs), including fixed wing and rotary wing vehicles as well as, unmanned submersible vehicles (USVs), which may swim or move along the floor of the body of liquid within the context of the teachings of the present discussion.

Further, to the extent the term "path" is used herein, such as in the context of navigation or manipulation, it should be appreciated that this term encompasses one-dimensional (1D) (such as along a track), two-dimensional (2D) (such as along a defined or undefined planar route), three-dimensional (3D) (such as movement in a volumetric space, including in the air or generally along a plane but incorporating vertical elements), or four-dimensional (4D) (such as where there are defined temporal aspects that may characterize a velocity, acceleration, or a time on station at a waypoint) aspects. Such as path, as used herein relates to a route or other movement plan along which a robot moves as part of performing one or more tasks as part of an automated or semi-automated process though it may also reference the movement of a manipulator arm or effector in the context of movement of the manipulator distinct from movement of the robot base. Thus, a "path" as used herein may be characterized as any 1D, 2D, 3D, or 4D route or path along which a device such as a robot and/or the robot's manipulator arm is moved to perform one or more assigned tasks. Such a path may be adaptive, such as dynamically adapting in response to sensor data acquired by the robot of the local environments in real- or near real-time, and may consist of one or more waypoints along which the robot and/or manipulator proceed in an ordered fashion, with the sequence and location of the waypoints defining the path or route. It should be appreciated that such a path may also incorporate not only temporal and/or spatial locations, but also action instructions to be taken at points and/or times defined on the path, such as grasping, delivering or otherwise manipulating tools as discussed herein.

To facilitate explanation and provide useful real-world context for the present approach, various examples of indoor environments in which a robot may perform a task may be referenced herein, such as offices, schools, hospitals, factories, and so forth. As may be appreciated however, the present approach may be broadly applicable to any environment and/or task context in which robots are employed to manipulate, sort, deliver, move, or otherwise interact with objects, such as instruments, controls, tools, and so forth. As used herein, the term "instruments" may be understood to encompass, tools, instruments, controls, or any item or device relevant to a task assigned to the robot and manipulable by the robot in performing the task. Such instruments may be freely movable within the environment, such as capable of being picked up, moved, and so forth. As may be appreciated, any examples described herein are provided merely to facilitate explanation, and the present approach is suitable for use in any context involving manipulation or interaction with environmental items. The present approach, therefore, is not intended to be limited to the context of the present examples.

Figure 1:
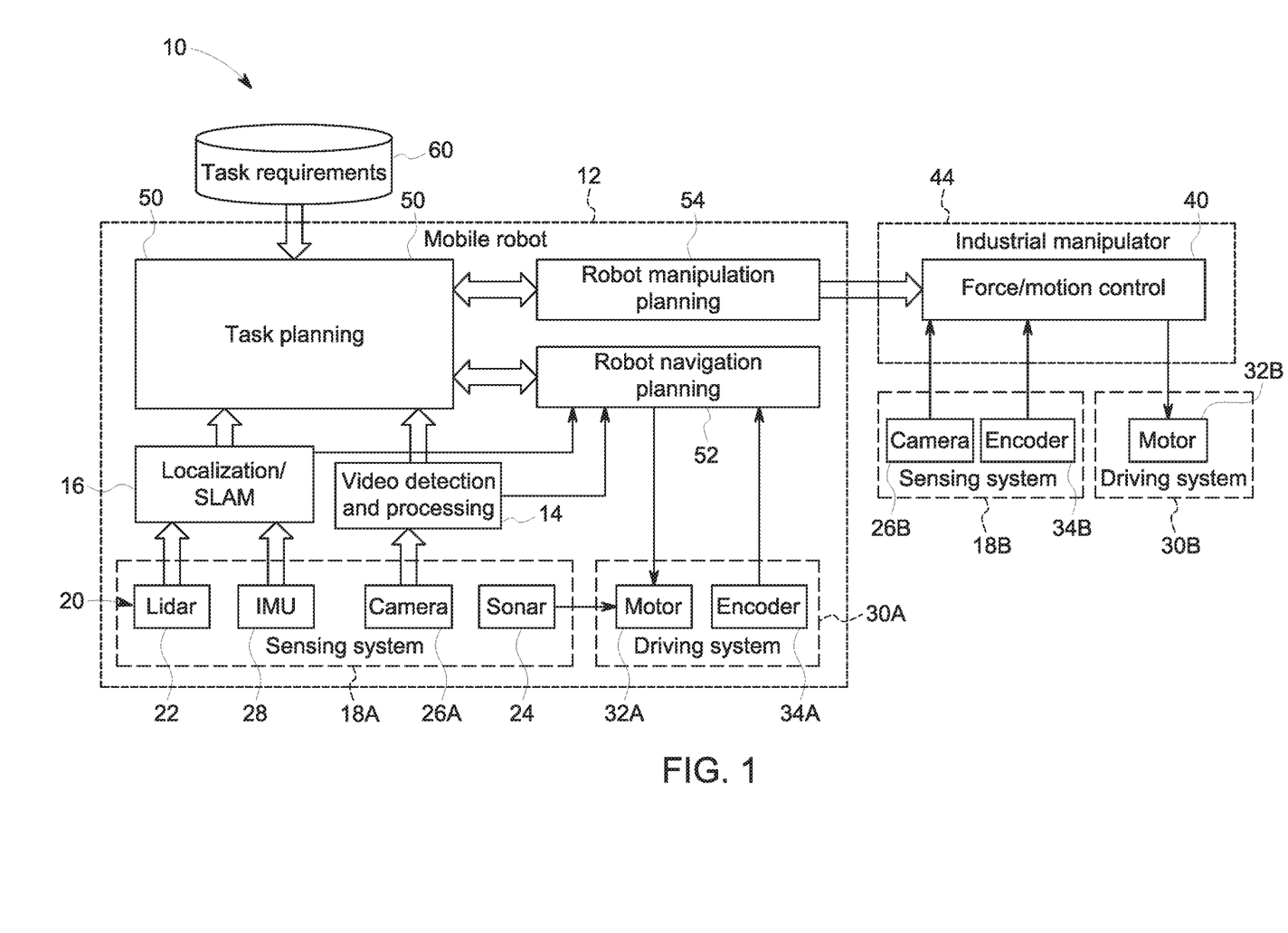
FIG. 1 is a schematic of a mobile robotic manipulation system, in accordance with aspects of the present approach.

With the preceding in mind, and turning to the figures, FIG. 1 introduces aspects of a robotic manipulation system 10 suitable for moving about an environment (such as via a robot base drive system 30A) and manipulating or interacting with items in the environment. FIG. 1 depicts a schematic of one embodiment of a robotic manipulation system 10. It should be understood, that other embodiments of the robot manipulation system 10 are envisaged and may include additional components, fewer components, and/or different combinations of components than those illustrated. In practice, certain of the features shown in FIG. 1 (such as industrial manipulator 44) may be provided as part of a mobile robot 12, either as an integral component or a separate component attached to the robot 12. It should be appreciated though that other aspects or components of the system 10 may be provided external to the robot, such as part of one or more non-robot servers or computer systems, including computers or server systems capable of storing and communicating task requirements 60 and/or of otherwise facilitating control, monitoring, oversight, or operation of one or both of the robot 12 and industrial manipulator 44. In other embodiments, all processing and control aspects illustrated may be provided as part of the robot.

In the depicted embodiment, the robot 12 includes a drive system 30A that may include components and functionality used to move the robot 12 in the environment, such as wheels or treads, motor(s) 32A, encoder 34A (configured to sense one or more parameters of the one or more motors 32A (e.g., rotational speed, linear displacement, etc.)), and so forth. The driving system 30A controls the position, the velocity, and the acceleration of the robot base. Such control may be implemented using feedback from one or more of localization/SLAM routines or modules 16, video detection and processing routines or modules 14, and encoders 34A. In one implementation the drive system 30A of the robot 12 includes or is controlled by a collaborative control mechanism, meaning humans can work closely with it. In such an implementation, the robot 12 can detect external forces and can adjust its motion and forces accordingly to avoid collisions and protect itself and people and objects in its environment. For example, in the depicted embodiment, a sonar 24 sensing modality is provided that can be used to detect obstacles in the environment, and, based upon sensed data to send signals to the motor(s) 32A of the robot base to avoid obstacles With respect to the manipulator 44, in one embodiment the manipulator 44 is a multiple degree-of-freedom (DOF) serial or parallel mechanical part, which can move freely in the work space and perform tasks. For example, the manipulator 44 may be an industrial-quality modular manipulator having multiple DOF (e.g., 6 degrees of freedom) and a gripper capable of lifting a mass suitable for the contemplated tasks (e.g., 1 kg, 2 kg, 5 kg, and so forth). For example, such a manipulator 44 may have multiple rotary joints, each parameterized by a joint angle to characterize the state and extension of the manipulator 44. In one such implementation the manipulator is driven one or more suitable motors 32B (e.g., seven reversible 24V DC motors).

The manipulator 44 may include at least one effector, such as an end-effector. One example of such an end-effector is a gripper. In one embodiment, the end-effector may be configured or designed to accommodate or tolerate a range of error, such as to handle errors, noises, and uncertainties in the environment. For example, one tolerant gripper that may be suitable for use in accordance with the present approach is self-aligning with respect to a pre-configured edge or interface provided on tools or instruments to be manipulated. In one such example of a self-aligning gripper, the jaws of the gripper and the pre-configured interface may have two sets of orthogonal slopes that self-align the interface on the manipulated instrument relative to the manipulator 44 when the jaws close. For example, slope features on the upper jaw and the upper part of the interface may align translation in the x-plane. Similarly, the slope features of the bottom jaw and the bottom part of the interface may align translation in the y-plane so that in combination the features of the upper and lower jaw of the gripper in conjunction with the interface provided on the object to be manipulated align the object in the x and y dimensions when engaged. Further, full closure of the jaws constrains translation in the z-plane. The pitch, roll and yaw of the object being manipulated are also constrained by these slope features and the closure of the jaws. Thus, such a self-aligning gripper (or other end-effector), when used, may provide tolerance over some range (e.g., 1 cm, 2 cm, and so forth) to address uncertainty in the location of an instrument, part, or object to be manipulated relative to the robot 12 and manipulator 44.

The robotic manipulation system 10 may, via a network or cellular interface, include or communicate with one or more remote servers (e.g., cloud server) to facilitate remote operation and/or transmission of sensed data or state information related to the robot and/or environment. In some embodiments, the robot 12 or sensors external to the robot 12 may provide sensor data to the remote server to convey information about the environment currently sensed by the robot 12, which may be relevant to the operation of the robot 12 and/or task performance by the robot 12 using the manipulator 44.

The robot 12 and/or manipulator 44 may include sensing systems 18 that may include one or more sensors 20 (e.g., tactile sensors, chemical sensors, methane sensors, temperature sensors, laser/LIDAR 22, sonar 24, cameras 26 (e.g., RGB and RGB-D cameras), inertial measurement units (IMU) 28, and so forth) configured to sense various qualities and collect data (e.g., environmental information) during operation of the robot 12 and/or performance of a task by the robot 12. The sensors may be used to acquire sensed data corresponding to the sensor type and observation range that conveys information about the environment where the robot 12 is located, where the end-effector of the manipulator 44 is pointed, and so forth.

With the preceding sensing system and drive system discussion in mind, in the depicted example, the robot 12 and manipulator 44 are depicted as discrete components, with each having a separate and distinct sensing system (i.e., robot sensing system 18A and manipulator sensing system 18B) and driving system (i.e., robot driving system 30A and manipulator driving system 30B). As may be appreciated, the extent of integration between the manipulator 44 and robot 12 may determine the extent to which the respective sensing and drive systems components referenced are separate and distinct systems or are common or shared systems or components. For example, the cameras may be part of a sensing system 18 shared by both the robot 12 and manipulator 44 or may be distinct, with cameras 26A being used solely for robot functions and camera 26B (such as a camera positioned on or near an end-effector of the manipulator 44) being used solely for manipulator functions. For the sake of simplifying discussion the embodiment of FIG. 1 presents such systems and components as being separate, though it should be understood that other implementations may instead share sensing or drive functionality for the robot 12 and manipulator 44, and thus have combined sensing and/or driving functionality.

Turning to the depicted example of a robotic sensing system 18A, in one embodiment laser measurements (e.g., lidar 22) and/or odometer readings (e.g., IMU 28) are provided as inputs to a localization module or algorithm (e.g., localization/SLAM (simultaneous localization and mapping) algorithm or module 16), which runs continuously or periodically to localize the pose of the robot 12 (e.g., position, orientation, and so forth) in the environment. Simultaneously, an environmental model may be built. In some situations, environmental mapping can be done before a task is performed or initiated to reduce the computing cost when the robot 12 is moving.

In the depicted example, cameras 26, such as RGB, RGB-D, and infrared cameras, may be used to collect the environmental information that may be processed (e.g., via video detection and processing routines or module 14) to detect or otherwise characterize the environment in which the robot 12 is located. By way of example, a camera 26A may be used to detect a target of interest (e.g., an item or object to be manipulated as part of a task) in the environment by the video detection and processing algorithm. The detection and recognition of a target of interest may be performed using a trained classifier. In one implementation, the environmental modeling is performed using Structure from Motion (SfM).

With respect to the depicted example of a manipulator sensing system 18B, in one embodiment such a sensing system may include a camera 26B, which as noted above may image the area in front of the end-effector (e.g., a gripper) of the manipulator 44 and thus be manipulator specific or may alternatively be fixed on the robot 12 but sensing an area in the vicinity of the end-effector. In addition, the manipulator sensing system 18B may include an encoder 34B configured to sense one or more parameters of the one or more motors 32B (e.g., rotational speed, linear displacement, etc.) of the manipulator driving system 30B. In the depicted example, and as discussed in greater detail below, a force/motion controller 40 of the manipulator 44 may receive a signal (e.g., feedback) from the one or more encoders 34B and/or cameras 26B and may output a control signal to the motor(s) 32B of the manipulator 44 to cause movement and/or actuation of the manipulator 44 or an effector of the manipulator 44.

Similarly, a vision detection and processing system 14 may receive data from the sensing system 18A of the robot 12, such as from camera 26A. The vision detection and processing system 14 may also generate outputs related to the operation of a task planning routine or module 50 and/or a robot navigation planning routine or module 52. The task planning routine or module 50 also communicates with a robot manipulation planning routine or module 54 in the depicted example.

Figure 2:
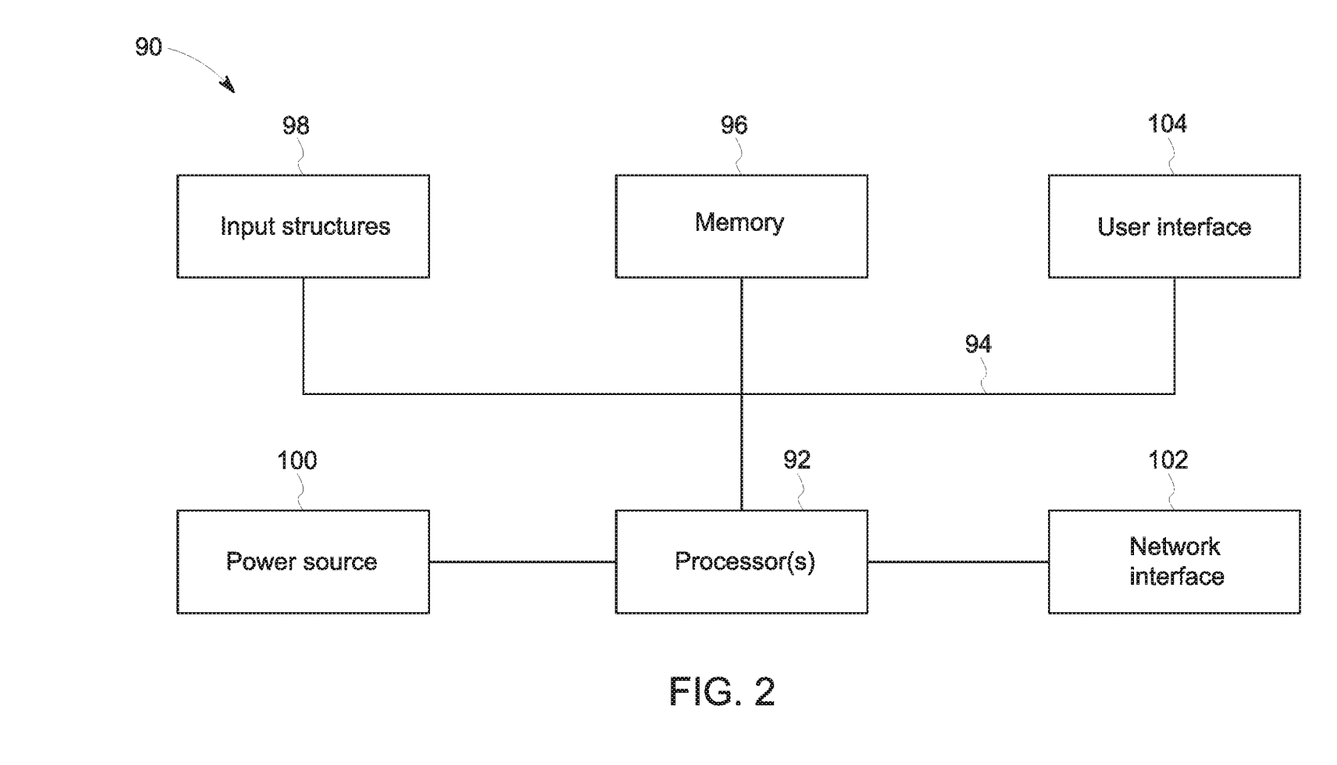
FIG. 2 is a block diagram of a processor based system suitable for use with mobile robotic manipulation system of FIG. 1, in accordance with aspects of the present approach.

One or several computers, as discussed with respect to FIG. 2, may be used to provide on-board computing resources for the robot 12 to process the sensed data, plan motions, make decisions, and control the robot 12 and the manipulator 44. By way of example, the robot manipulation system 10 is illustrated as including various planning and/or control systems, which may be implemented using, or as part of, one or more processor-based systems as discussed in greater detail with respect to FIG. 2. For example, such control systems may be based on or include one or more memory components and one or more processors in communication with the memory components.

With this in mind, the robot 12, the manipulator 44, (and any remote servers or devices with which the robot 12 and/or manipulator 44 communicates) may be provided as a processor-based system 90 as shown in FIG. 2 in which one or more microprocessors execute routines and/or algorithms to provide the functionality described herein. Before providing additional detail into operation of the robotic manipulation system 10, it may be beneficial to briefly provide an example of aspects of a processor-based system 90 that may include components or features found in one or more of a robot 12, manipulator 44, and/or remote server.

For example, turning to FIG. 2, such devices or systems may contain components as shown in the figure, which depicts a block diagram of example components of a processor-based system 90. As used herein, a processor-based system 90 may be implemented as a robot 12, manipulator 44, or as one or more computing systems, including laptop, notebook, desktop, tablet, or workstation computers, as well as server type devices or portable, communication type devices, such as cellular telephones, and/or other suitable computing devices, and or all of which may be used in the robotic manipulation system 10.

As illustrated, the processor-based system 90 may include various hardware components, such as one or more processors 92, one or more busses 94, memory 96, input structures 98, a power source 100, a network interface 102, a user interface 104, and/or other computer components useful in performing the functions described herein.

The one or more processors 92 are, in certain implementations, microprocessors (e.g., CPUs, GPUs, and so forth) configured to execute instructions stored in the memory 96 or other accessible locations. Alternatively, the one or more processors 92 may be implemented as application-specific integrated circuits (ASICs), field-programmable gate arrays (FPGAs), and/or other devices designed to perform functions discussed herein in a dedicated manner. As will be appreciated, multiple processors 92 or processing components may be used to perform functions discussed herein in a distributed or parallel manner.

The memory 96 may encompass any tangible, non-transitory medium for storing data or executable routines (including routines and/or algorithms for processing sensed data, planning motions of the robot 12 and/or manipulator 44, making decisions, and controlling the manipulator 44, or otherwise facilitating manipulation of instruments or objects as discussed herein), including volatile memory, non-volatile memory, or any combination thereof. Although shown for convenience as a single block in FIG. 2, the memory 96 may actually encompass various discrete media or types of media in the same or different physical locations. The one or more processors 92 may access data in the memory 96 via one or more busses 94.

The input structures 98 are used to allow a user to input data and/or commands to the device 90 and may include mice, touchpads, touchscreens, keyboards, VR controllers, motion or optical sensors, microphones, and so forth. The power source 100 can be any suitable source for providing power to the various components of the processor-based system 90, including line and battery power. In the depicted example, the device 90 includes a network interface 102. Such a network interface 102 may allow communication with other devices on a network using one or more communication protocols. In the depicted example, the processor-based system 90 includes a user interface 104, such as a display configured to display images or data and/or speakers configured to play sound or acoustic data provided by the one or more processors 92.

As will be appreciated, in a real-world context a processor-based system 90, may be employed to implement some or all of the present approach, such as performing the functions of a remote or communications server, manipulator 44, and/or robot 12 or other processing devices used operating or monitoring a robot 12 that performs tasks involving the manipulation of tools or objects.

With the preceding comments in mind, the interrelationship and operations of the various components introduced above in the performance of a robot navigation and object manipulation operation will be discussed. As described herein, the system 10 is a robotic manipulation system used to facilitate the manipulation and/or handling of objects by a robot 12 in the performance of a task. One or several processors may be used to provide on-board computing resources for the robot 12 and/or manipulator 44 to process sensed data, to plan and execute motions, to make decisions, and to otherwise control the robot 12 and manipulator 44.

Turning back to FIG. 1, such robot navigation and object manipulation is facilitated by a task planning algorithm or module 50 that plans the sequence of operations for the robot 12 and manipulator 44 to perform. This planning may be based on task requirements 60 provided by human operators or the system 10. The output of this task planning 50 may be characterize as an array of class instances, with each instance representing one operation. In the description of each operation, either the manipulator 40 or the robot base (i.e., robot 12) will be chosen, and the target configuration, the target operation, the environmental constraints, and the performance will be determined.

Figure 3:
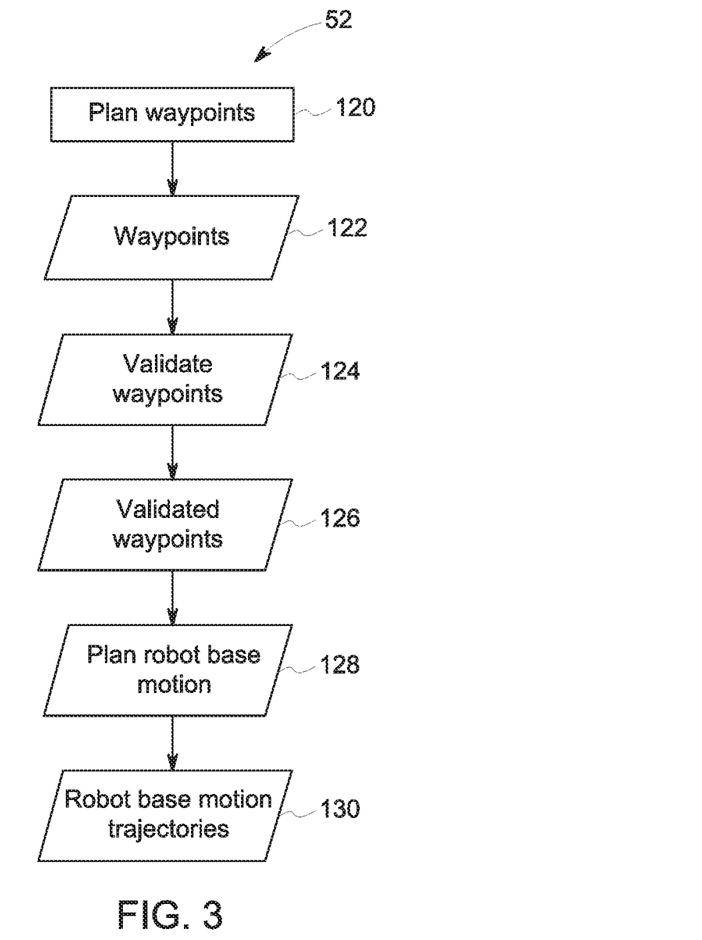
FIG. 3 is a process flow depicted steps in a robot navigation planning process, in accordance with aspects of the present approach.
Figure 4:
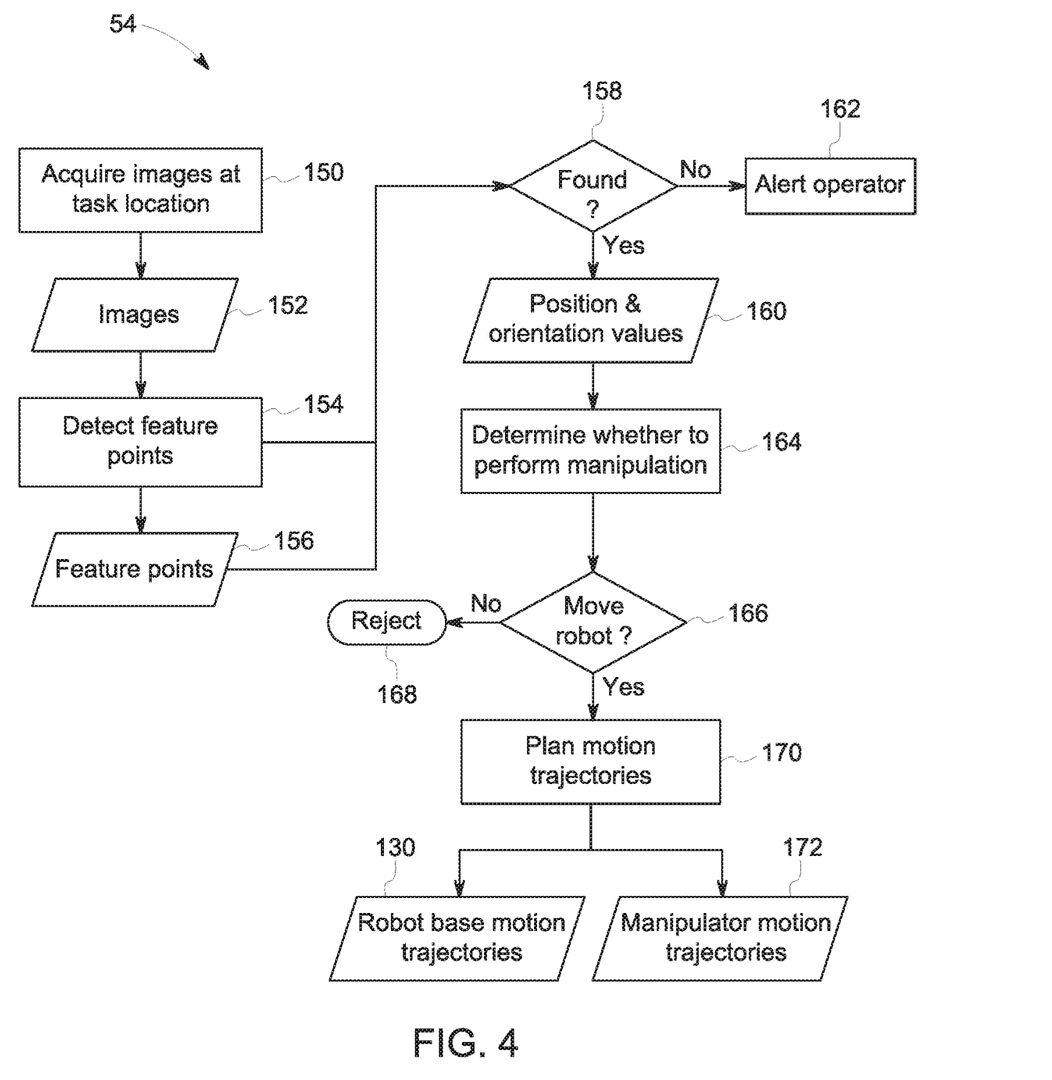
FIG. 4 is a process flow depicted steps in a robot manipulation planning process, in accordance with aspects of the present approach.

This process is described in further detail in FIGS. 3 and 4, which depict process flows related to robot navigation planning (FIG. 3) and robot manipulation planning (FIG. 4) as they may be embodied by the respective algorithms or routines shown in FIG. 1 in one embodiment. With respect to robot navigation planning stage 52, and turning to FIG. 3, in response to task planning 50 a sequence of waypoints 122 are planned (block 120) to facilitate manipulation tasks at working locations. In one implementation, waypoints 122 are planned taking obstacle avoidance into consideration.

The generated waypoints 122 may, in one implementation, be sent to task planning 50 for validation (block 124) to generate validated waypoints 126. This validation process makes certain that collision with obstacles is avoided. In situations where a collision appears unavoidable, the system 10 may defer the task.

Successful validation of waypoints may trigger robot base motion planning (block 128) to generate paths for robot 12 to navigate. In the depicted example, motion planning 128 involves planning or otherwise generating motion trajectories 130 for the robot base. In one implementation, the motion trajectories are planned using potential field-based techniques. In this example, the navigation planning process provides a plan (in the form of the series of trajectories 130) for the robot to navigate through the validated waypoints 126 and execute corresponding desired manipulation tasks at each processing location. Reactive obstacle avoidance may also be included when the robot moves (such as based on sensor feedback as shown in FIG. 1). In this process, localization may also be applied to provide accurate pose information of the robot base.

While the preceding describes navigation of the robot 12, i.e., the robot base, from site to site, a further aspect of the present approach is robot manipulation planning 54 in response to task planning 50, an example of which is illustrated in FIG. 4.

As discussed herein, once the robot 12 arrives at a task location (based on the navigation plan described above), the robot 12 needs to perform certain task-specific manipulation operations (e.g., grasping, and so forth) in accordance with the present approach.

In this manipulation stage, there are two major sub-tasks for the robot 12. One is to ensure the successful manipulation of the task-related object. The other is to minimize energy consumption. Thus, the planning strategy in manipulation stage may involve moving the robot 12 (i.e., the robot base) to increase the working space and the success rate of manipulation and to optimize an energy consumption equation. For example, manipulation planning, in view of these objective, may involve moving the robot base so as to allow the robot to use less torque on its joints to perform manipulation tasks. In one implementation, the RRT-Connect algorithm may be employed in manipulation planning.

With this general guidance in mind, and turning to FIG. 4, in one implementation, when arriving at a task manipulation location on the waypoint sequence, the robot 12 searches for manipulation points (e.g., image acquisition block 150) in the environment. In one example, in the searching task, the robot 12 moves the manipulator 44 above the working station or other target location and captures images 152. Images 152 obtained by the camera 26B are processed (block 154) to detect pre-defined feature points 156. If found (decision block 158), the position and orientation values 160 are sent to task planning 50 for decision making. If not found, task planning may generate a signal to inform human operators that the task failed (block 162).

Returned position and orientation values 160 cannot guarantee that the robot 12 can successfully grab manipulate the object in the environment. As a result, in the depicted example, task planning logic evaluates the position and orientation values to determine (block 164) how to proceed or whether to proceed. This decision making logic may be based on the capability of the robot and concerns related to the nearby environment, including humans in the vicinity.

For example, even if the robot 12 can see the object to be manipulated, the robot 12 may not be able to perform the manipulation task due to mechanical limitations of the manipulator 44. In such a circumstance, the mobility of the robot 12 may be leveraged to increase the chances of completing a manipulation task since the robot 12 has the ability to make minor positioning adjustments. In this example, the task planning logic decides whether the robot 12 should move or not (decision block 166) in order to manipulate the object. If it is not possible for robot to manipulate the object even it can move someplace else, the task planning logic rejects (block 168) the task.

Conversely, if the task planning logic determined that the manipulation tasks are within the capability of the robot 12, the task planning logic plans the motion trajectories (block 170) for the robot base (trajectories 130) and the manipulator 44 (trajectories 172). Generated motion trajectories 130, 172 may be sent to the robot navigation routines or module 52 and/or the robot manipulation routines or module 54 for execution in order to perform the task.

By way of further example, a sample of pseudo-code exemplifying these aspects is as follows:

```
Repeat until All Searching Points are Searched or Object Detected
    Searching:
        Move manipulator to the next search point
        Detect objects
        If (Object Detected)
            Optimize Energy Consumption Cost Equation
            If (Object within the desired manipulation area)
                Compute manipulation point
                Plan motion trajectories of the manipulator
                Manipulate
            Else
                Plan motion trajectories of the robot base
                Move to new working location
                Detect objects
                If (Object Detected)
                    Compute manipulation point
                    Plan motion trajectories of the manipulator
                    Manipulate
                End
            End
            Move to original working location
        End
End
```

Technical effects of the invention include integrated planning of robot navigation and manipulator motion in performing tasks. In particular, as discussed herein visual information is used for the robot to locate a target object when it arrives at a working location and adjustments may be made based on this information that may include moving the robot and planning a manipulator arm motion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented method for manipulating one or more objects, the processor-implemented method comprising acts of:
    moving a robot having a robot base and a manipulator coupled to the robot base along a path from an initial location to a task location;
    at the task location, moving the manipulator of the robot relative to the task location to acquire images via a camera coupled to the manipulator;
    detecting pre-defined interface points of an object, by which the manipulator may grasp the object, within the images acquired by the camera coupled to the manipulator;
    determining whether to move the robot base to an updated position at the task location, based upon a position and an orientation of the pre-defined interface points, prior to generating manipulator motion trajectories to manipulate the object with the manipulator, wherein the manipulator is configured to grasp the object at the pre-defined interface points and move the object once grasped as part of a task performed by the robot when the robot is suitably positioned and oriented relative to the object; and
    upon determining to move the robot base prior to manipulating the object:
        generating robot base motion trajectories;
        moving the robot base in accordance with the robot base motion trajectories to reposition the robot base to the updated position at the task location;
        generating the manipulator motion trajectories; and
        moving the manipulator in accordance with the manipulator motion trajectories to manipulate the object.

2. The processor-implemented method of claim 1, comprising alerting an operator if no pre-defined interface points are detected.

3. The processor-implemented method of claim 1, comprising:
    upon determining to not move the robot base prior to manipulating the object:
        generating the manipulator motion trajectories; and
        moving the manipulator in accordance with the manipulator motion trajectories to manipulate the object.

4. The processor-implemented method of claim 1, wherein a determination of whether to move the robot base prior to manipulating the object is based at least on resolving an energy consumption function.

5. The processor-implemented method of claim 1, wherein a determination of whether to move the robot base prior to manipulating the object is based at least on reducing or minimizing torque on joints of the manipulator.

6. The processor-implemented method of claim 1, wherein the manipulator comprises a self-aligning end-effector used to grasp the object at a respective one of the pre-defined interface points.

7. A robotic manipulation system, comprising:
    a mobile robot having a robot base, the mobile robot comprising:
        one or more sensors configured to generate sensor data of at least a portion of an environment in which the mobile robot is located; and
        a first driving system configured to move the robot base of the mobile robot;
    a manipulator attached to the robot base, the manipulator comprising:
        an effector coupled to the manipulator and configured to interact with objects;
        a camera coupled to the manipulator and configured to acquire images of an area accessible by the manipulator; and
        a second driving system configured to move the manipulator; and
    one or more processing components configured to:
        instruct the first driving system to move the robot base of the mobile robot along a path from an initial location to a task location;
        move the manipulator relative to the task location to acquire images of the task location via the camera coupled to the manipulator;
        detect pre-defined interface points of a respective object within the images with which the manipulator may grasp the respective object;
        determine whether to move the robot base to an updated position at the task location, based upon a position and an orientation of the pre-defined interface points, prior to generating manipulator motion trajectories to manipulate the respective object with the manipulator, wherein the manipulator is configured to grasp the respective object at the pre-defined interface points and move the respective object once grasped as part of a task performed by the robot when the robot is suitably positioned and oriented relative to the respective object; and upon determining to move the mobile robot prior to manipulating the respective object:
  generate robot base motion trajectories;
  move the robot base of the mobile robot in accordance with the robot base motion trajectories to reposition the robot base;
  generate the manipulator motion trajectories; and
  move the manipulator in accordance with the manipulator motion trajectories to manipulate the respective object.

8. The robotic manipulation system of claim 7, wherein the one or more processing components are further configured to alert an operator if no pre-defined interface points are detected.

9. The robotic manipulation system of claim 7, wherein the one or more processing components are further configured to:
  upon determining to not move the robot base prior to manipulating the respective object:
    generate the manipulator motion trajectories; and
    move the manipulator in accordance with the manipulator motion trajectories to manipulate the respective object.

10. The robotic manipulation system of claim 7, wherein a determination of whether to move the robot base prior to manipulating the respective object is based at least on resolving an energy consumption function.

11. The robotic manipulation system of claim 7, wherein a determination of whether to move the robot base prior to manipulating the respective object is based at least on reducing or minimizing torque on joints of the manipulator.

12. The robotic manipulation system of claim 7, wherein the effector comprises a self-aligning gripper used to grasp the respective object at a respective one of the pre-defined interface points.

13. One or more non-transitory computer-readable media encoding processor-executable routines, wherein the routines, when executed by a processor, cause acts to be performed comprising:
  moving a robot having a robot base and a manipulator along a path from an initial location to a task location;
  at the task location, moving the manipulator of the robot relative to the task location to acquire images via a camera couple to the manipulator;
  detecting pre-defined interface points of an object, within the images, by which the manipulator may grasp the object;
  determining whether to move the robot base to an updated position at the task location, based upon a position and an orientation of the pre-defined interface points, prior to generating manipulator motion trajectories to manipulate the object with the manipulator, wherein the manipulator is configured to grasp the object at the pre-defined interface points and move the object once grasped as part of a task performed by the robot when the robot is suitably positioned and oriented relative to the object; and
  upon determining to move the robot base prior to manipulating the object:
    generating robot base motion trajectories;
    moving the robot base in accordance with the robot base motion trajectories to reposition the robot base to the updated position at the task location;
    generating the manipulator motion trajectories; and
    moving the manipulator in accordance with the manipulator motion trajectories to manipulate the object.

14. The one or more non-transitory computer-readable media of claim 13, wherein the routines, when executed by the processor, cause further acts to be performed comprising:
  upon determining to not move the robot base prior to manipulating the object:
    generating the manipulator motion trajectories; and
    moving the manipulator in accordance with the manipulator motion trajectories to manipulate the object.

15. The one or more non-transitory computer-readable media of claim 13, wherein a determination of whether to move the robot base prior to manipulating the object is based at least on resolving an energy consumption function.

16. The one or more non-transitory computer-readable media of claim 13, wherein a determination of whether to move the robot base prior to manipulating the object is based at least on reducing or minimizing torque on joints of the manipulator.

17. The one or more non-transitory computer-readable media of claim 13, wherein the routines, when executed by the processor, cause further acts to be performed comprising:
  alerting an operator if no pre-defined interface points are detected.

* * * * *